(12) United States Patent
Kawano et al.

(10) Patent No.: US 10,037,470 B2
(45) Date of Patent: Jul. 31, 2018

(54) PITCH ANGLE ESTIMATION APPARATUS

(71) Applicant: DENSO CORPORATION, Kariya, Aichi-pref. (JP)

(72) Inventors: Taiki Kawano, Nishio (JP); Naoki Kawasaki, Nishio (JP); Naoki Nitanda, Kariya (JP); Kenta Hoki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 174 days.

(21) Appl. No.: 15/230,208

(22) Filed: Aug. 5, 2016

(65) Prior Publication Data

US 2017/0039433 A1    Feb. 9, 2017

(30) Foreign Application Priority Data

Aug. 6, 2015    (JP) .................................. 2015-155898

(51) Int. Cl.
*G06K 9/00* (2006.01)
*G06K 9/46* (2006.01)
*H04N 5/232* (2006.01)

(52) U.S. Cl.
CPC ....... *G06K 9/00791* (2013.01); *G06K 9/4671* (2013.01); *H04N 5/232* (2013.01)

(58) Field of Classification Search
CPC ... G06K 9/00791; G06K 9/4671; H04N 5/232
See application file for complete search history.

(56) References Cited

U.S. PATENT DOCUMENTS

| 6,282,496 B1* | 8/2001 | Chowdhary ......... G01C 21/165 342/357.31 |
| 6,535,114 B1 | 3/2003 | Suzuki et al. |
| 2007/0154068 A1* | 7/2007 | Stein .................. G01C 3/22 382/106 |
| 2009/0140887 A1* | 6/2009 | Breed ................. G01C 21/165 340/990 |
| 2010/0079590 A1* | 4/2010 | Kuehnle ............ G06K 9/00798 348/118 |

* cited by examiner

*Primary Examiner* — Neil Mikeska
(74) *Attorney, Agent, or Firm* — Knobbe, Martens, Olson & Bear, LLP (57) ABSTRACT

In a pitch angle estimation apparatus, an image acquirer sequentially acquires images in a forward or rearward direction of a vehicle. Each image is referred to as a frame. A movement amount calculator extracts a feature point from each of the images acquired by the image acquirer and calculates an amount of movement of the feature point in a vertical direction of the image. A pitch angle calculator calculates a pitch angle of the vehicle based on the amount of movement of the feature point. An output unit outputs the pitch angle calculated by the pitch angle calculator. A low frequency component calculator calculates a low frequency component of the pitch angle calculated by the pitch angle calculator. An output determiner determines whether to output the pitch angle based on the magnitude of the low frequency component calculated by the low frequency component calculator.

19 Claims, 12 Drawing Sheets

PREVIOUS FRAME

FIG.4B

CURRENT FRAME

FIG.4C

PREVIOUS FRAME  CURRENT FRAME

PITCH ANGLE ESTIMATION APPARATUS

CROSS-REFERENCE TO RELATED APPLICATION

This application is based on and claims the benefit of priority from earlier Japanese Patent Application No. 2015-155898 filed Aug. 6, 2015, the description of which is incorporated herein by reference.

BACKGROUND (Technical Field)

The present invention relates to a pitch angle estimation apparatus.

(Related Art)

Conventionally, techniques are known for detecting white lines, vehicles, and the like in an image captured by a camera mounted on an own vehicle. Positions of the white lines and the vehicles other than the own vehicle may be varied with a pitch angle of the own vehicle. Therefore, in order to accurately determine the positions of the white lines and the other vehicles in the image, it is necessary to estimate the pitch angle of the own vehicle. An apparatus capable of estimating the pitch angle of the own vehicle is disclosed in Japanese Patent Application Laid-Open Publication No. 2001-266160.

A known method of estimating the pitch angle of the own vehicle includes extracting a feature point from the image acquired using the camera mounted on the own vehicle and estimating the pitch angle of the own vehicle from movement of the feature point in a vertical direction of the image.

However, the movement of the feature point may be affected not only by the pitch angle of the own vehicle, but also by a change in gradient of a road on which the own vehicle is traveling. Thus, if the own vehicle is traveling on a road having a significant change in gradient, the above method may provide an inaccurate pitch angle.

In consideration of the foregoing, exemplary embodiments of the present invention are directed to providing a pitch angle estimation apparatus capable of preventing outputting an inaccurate pitch angle.

SUMMARY

In accordance with an exemplary embodiment of the present invention, there is provided a pitch angle estimation apparatus including: an image acquirer configured to sequentially acquire images in a forward or rearward direction of a vehicle, each image being referred to as a frame; a movement amount calculator configured to extract a feature point from each of the images acquired by the image acquirer and calculate an amount of movement of the feature point in a vertical direction of the image; a pitch angle calculator configured to calculate a pitch angle of the vehicle based on the amount of movement of the feature point calculated by the movement amount calculator; an output unit configured to output the pitch angle calculated by the pitch angle calculator; a low frequency component calculator configured to calculate a low frequency component of the pitch angle calculated by the pitch angle calculator; and an output determiner configured to determine whether to output the pitch angle based on the magnitude of the low frequency component calculated by the low frequency component calculator.

The pitch angle estimation apparatus configured as above can stop outputting the pitch angle based on or in response to the magnitude of the low frequency component. Therefore, for example, in the case of a large low frequency component of the pitch angle due to a large change in gradient of a road on which the vehicle is traveling, outputting the pitch angle can be stopped, which can prevent outputting an inaccurate pitch angle due to effects of the change in road gradient or the like.

In accordance with another exemplary embodiment of the present invention, there is provided a pitch angle estimation apparatus including: an image acquirer configured to sequentially acquire images in a forward or rearward direction of a vehicle, each image being referred to as a frame; a movement amount calculator configured to extract a feature point from each of the images acquired by the image acquirer and calculate an amount of movement of the feature point in a vertical direction of the image; a pitch angle calculator configured to calculate a pitch angle of the vehicle based on the amount of movement of the feature point; a low frequency component calculator configured to calculate a low frequency component of the pitch angle calculated by the pitch angle calculator; a corrector configured to correct the pitch angle by reducing the low frequency component of the pitch angle calculated by the low frequency component calculator; and an output unit configured to output the pitch angle calculated by the pitch angle calculator and then corrected by the corrector.

In the pitch angle estimation apparatus configured as above, the pitch angle calculator corrects the calculated pitch angle by reducing the low frequency component and outputs a corrected pitch angle. Therefore, an accurate pitch angle less susceptible to the change in road gradient can be output.

DESCRIPTION OF SPECIFIC EMBODIMENTS

Embodiments of the present invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

First Embodiment

1. Pitch Angle Estimation Apparatus

Figure 1:
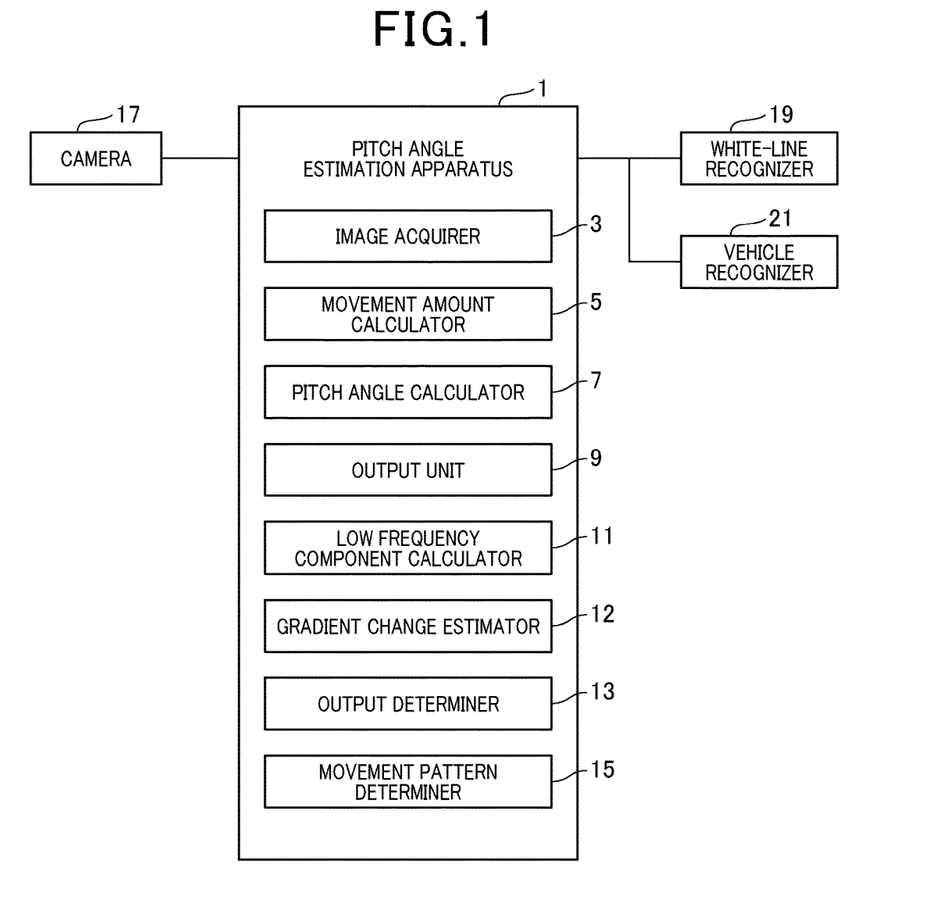
FIG. 1 is a block diagram of a pitch angle estimation apparatus in accordance with a first embodiment of the present invention.

A pitch angle estimation apparatus 1 in accordance with a first embodiment of the present invention will now be described with reference to FIG. 1. The pitch angle estimation apparatus 1 is mounted on a vehicle. The vehicle carrying the apparatus 1 is hereinafter referred to as an own vehicle. The pitch angle estimation apparatus 1 may be configured as a well-known computer including a central processing unit (CPU), a read-only memory (ROM), a random-access memory (RAM), and other components. Various processing described later may be performed by the CPU executing computer programs stored in the ROM.

The pitch angle estimation apparatus 1 includes, as functional blocks, an image acquirer 3, a movement amount calculator 5, a pitch angle calculator 7, an output unit 9, a low frequency component calculator 11, a gradient change estimator 12, an output determiner 13, a movement pattern determiner 15. Functions of these blocks will be described later.

The own vehicle further includes a camera 17, a white-line recognizer 19, and a vehicle recognizer 21. The camera 17 is configured to acquire images of the scene in front of the own vehicle. A position and angle of the camera 17 are fixed relative to the own vehicle. Therefore, when an object located at a certain position as viewed from the own vehicle is captured by the camera 17, a vertical position of the object in each image from the camera 17 will not change if the gradient of a road on which the own vehicle is traveling remains unchanged and if a pitch angle of the own vehicle is kept at zero degrees.

If the gradient of the road on which the own vehicle is traveling or the pitch angle of the own vehicle changes, the vertical position of the object in each image will change over time.

The white-line recognizer 19 is configured to recognize white lines in a well-known manner using the images acquired by the camera 17. The vehicle recognizer 21 is configured to recognize vehicles other than the own vehicle in a well-known manner using the images acquired by the camera 17.

2. Processing to be Performed in the Pitch Angle Estimation Apparatus

Processing to be performed in the pitch angle estimation apparatus 1 every predetermined time interval will now be described with reference to FIGS. 2-10. In step S1 of FIG. 2, the image acquirer 3 acquires a sequence of images captured by the camera 17. In the followings, each image may be referred to as a frame. The frame acquired in step S1 during a current cycle may be referred to as a current frame. The frame that precedes the current frame by n frames may be referred to as an N-th previous frame (N being a positive integer). For example, the frame that precedes the current frame by one frame may be referred to as a first previous frame. Unless otherwise indicated, the previous frame refers to the first previous frame.

In step S2, the movement amount calculator 5 performs movement amount calculation processing. This processing will now be described with reference to FIGS. 3-4. In step S21 of FIG. 3, the movement amount calculator 5 extracts feature points from the current frame acquired in step S1. The feature points refer to points that are easy to track on the image. The feature points may include, but are not limited to, corner points of areas distinguishable from the surroundings of the own vehicle. The extraction of the feature points may be performed using a well-known technique, such as Good Features To Track, Harris Features From Accelerated Test, Oriented FAST and Rotated BRIEF or the like.

Figure 3:
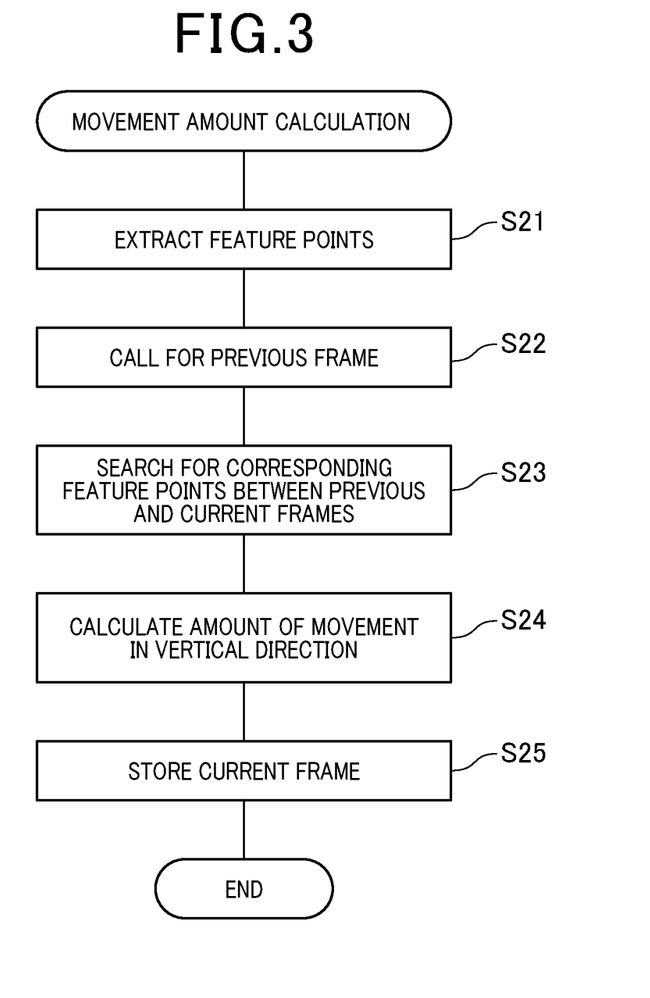
FIG. 3 is a flowchart of movement amount calculation processing to be performed in the pitch angle estimation apparatus of FIG. 1.

In step S22, the movement amount calculator 5 calls for the previous frame. It should be noted that feature points have been extracted also from the previous frame in step S21 during the previous cycle.

Figure 4A:
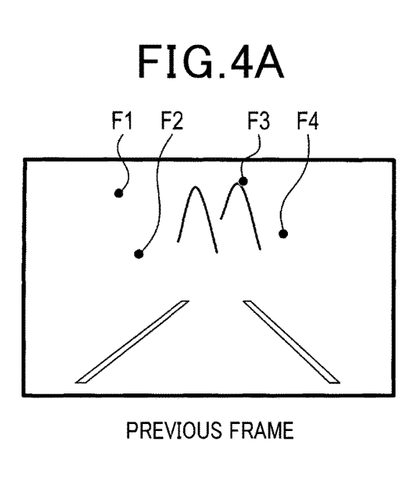
FIG. 4A is an example of feature points extracted from a previous image.
Figure 4B:
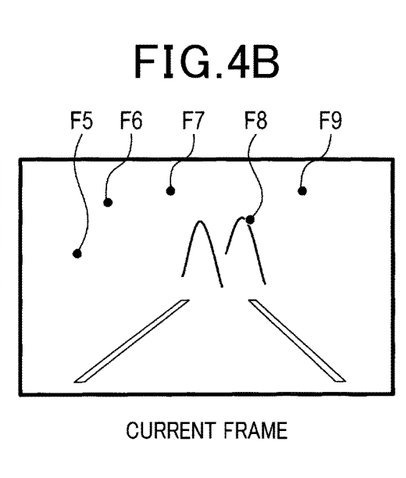
FIG. 4B is an example of feature points extracted from a current image.
Figure 4C:
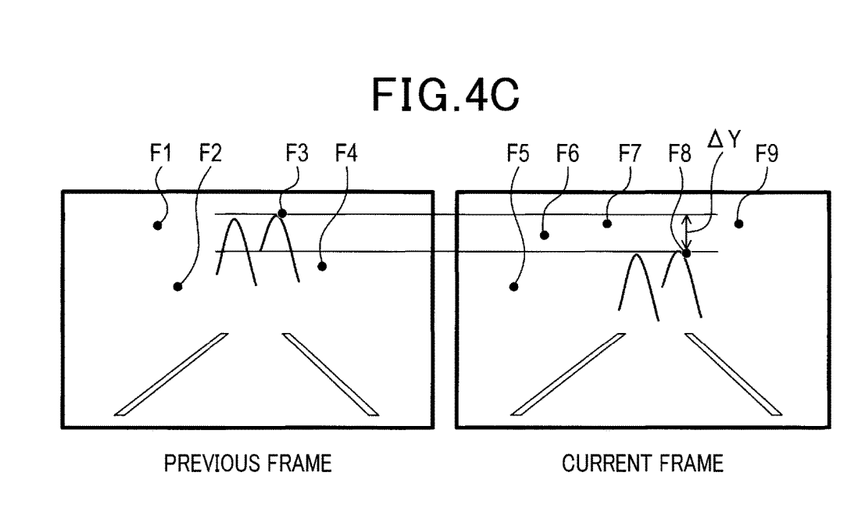
FIG. 4C is an example of calculating an amount of movement between corresponding feature points respectively extracted from the previous and current images.

In step S23, based on a principle of optical flow, the movement amount calculator 5 searches for feature points in the previous frame, each of which corresponds to (or is similar to or coincides with) one of the feature points extracted from the current frame. For example, FIG. 4A shows the feature points F1-F4 extracted from the previous frame, and FIG. 4B shows the feature points F5-F9 extracted from the current frame. In step S23, the movement amount calculator 5 searches for a feature point in the previous frame corresponding to the feature point F5 in the current frame. Similarly, the movement amount calculator 5 searches for feature points in the previous frame respectively corresponding to the feature points F6-F9 in the current frame.

In this example, the feature point F8 of the current frame corresponds to the feature point F3 of the previous frame, where the feature points F8 and F3 correspond to a top of the same mountain. Such feature point search may be performed in a well-known manner, such as Block Matching or the like. More generally, there may be a plurality of feature points in the previous frame respectively corresponding to different feature points in the current frame. For simplicity, in the following descriptions, it is assumed that there is only one pair of corresponding feature points between the previous and current frames (e.g., the pair of feature points F3 and F8).

In step S24, using point-to-point correspondence between these feature points searched in step S23, the movement amount calculator 5 calculates an amount of movement $\Delta Y$ in the vertical direction for the pair of corresponding feature points. In the example shown in FIG. 4C, the feature point F8 in the current frame and the feature point F3 in the previous frame correspond to each other. The movement amount calculator 5 calculates an amount of movement ΔY from the feature point F3 to the feature point F8 in the vertical direction.

The amount of movement ΔY is a signed numerical value. If a feature point in the current frame is higher in position than its corresponding feature point in the previous frame, the amount of movement ΔY is positive. If a feature point in the current frame is lower in position than its corresponding feature point in the previous frame, the amount of movement ΔY is negative. An absolute value of the amount of movement ΔY represents a distance between the corresponding feature points in the vertical direction.

In step S25, the movement amount calculator 5 stores the current frame and the feature points extracted from the current frame. The stored current frame will be called for as a previous frame in step S22 of the movement amount calculation processing during the next cycle.

Figure 2:
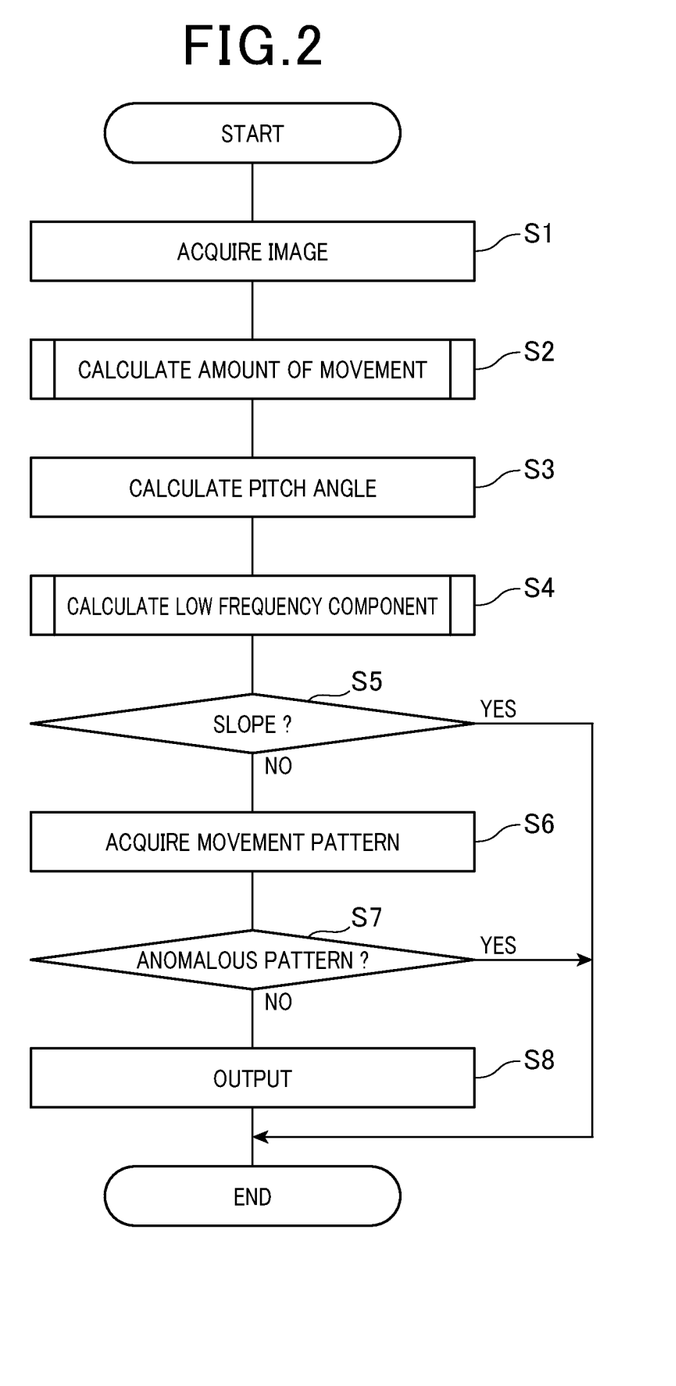
FIG. 2 is a flowchart of processing to be performed in the pitch angle estimation apparatus of FIG. 1.

Returning to FIG. 2, in step S3, the pitch angle calculator 7 calculates a pitch angle P of the own vehicle at the current frame according to the following equation (1) using the amount of movement ΔY acquired in step S2, $$P = P' + K\Delta Y \quad (1)$$

wherein P' is a pitch angle of the own vehicle at the previous frame. The pitch angle P' is a pitch angle calculated in step S3 using the first previous frame and the second previous frame. K is a predetermined positive constant. K may be one, less than one, or greater than one. KΔY is an amount of change in the pitch angle for a time period from the acquisition of the precious frame to the acquisition of the current frame. In the absence of the pitch angle P' acquired from the previous frame, an initial value P0 (being a fixed value) may be used instead.

As described above, the position and angle of the camera 17 are fixed relative to the own vehicle. Therefore, the amount of movement ΔY is proportional to the amount of change in the pitch angle, and thus can be denoted by KΔY.

Figure 5:
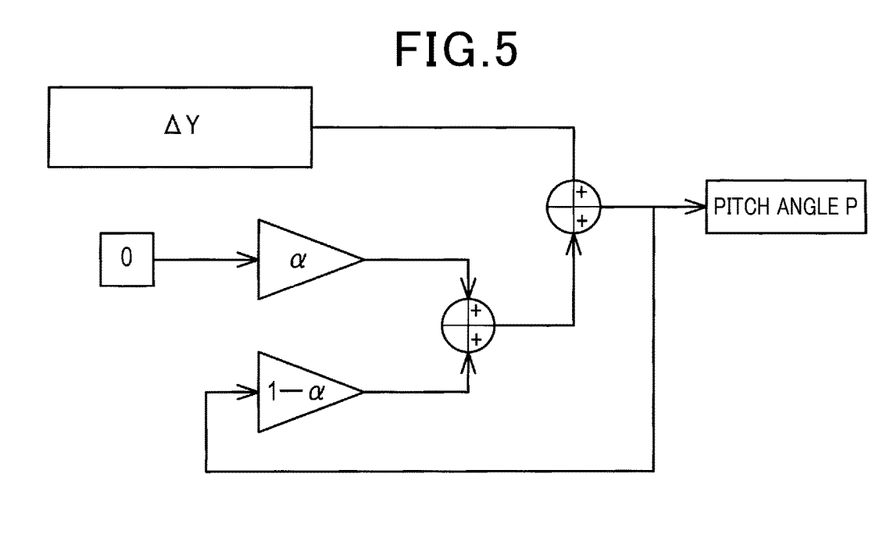
FIG. 5 is a block diagram of an integrator having a forgetting factor α.

The pitch angle P at the current frame may be calculated according to the following equation (2).

$$P = (1-\alpha)P' + K\Delta Y \quad (2)$$

wherein a is a forgetting factor that is greater than zero and less than one (i.e., 0<α<1). The pitch angle P can be calculated by integrating the amount of movement ΔY using an integrator having the preset forgetting factor α as shown in FIG. 5. Even if the pitch angle P' at the previous frame is inaccurate for some reason, use of the equation (2) can reduce its affect on the pitch angle P at the current frame.

Returning to FIG. 2, in step S4, the low frequency component calculator 11 calculates a low frequency component of the pitch angle P calculated in step S3. This processing will now be described with reference to FIGS. 6, 7A, 7B, 8A, 8B, and 9. The low frequency component refers to a component of much lower frequencies caused by changes in road gradient than pitching frequencies of the own vehicle.

Figure 6:
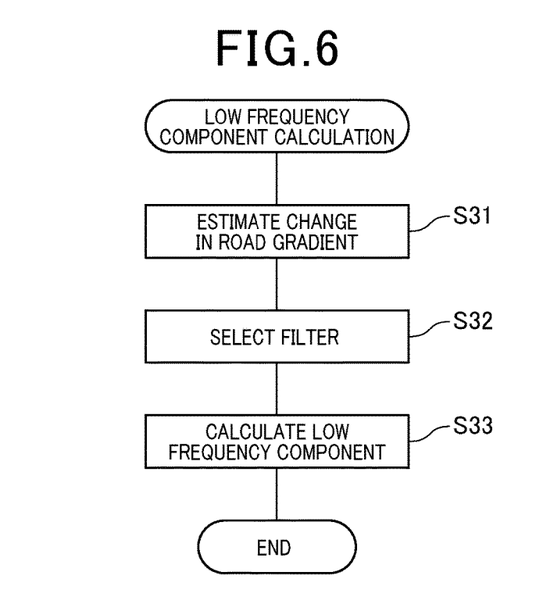
FIG. 6 is a flowchart of low frequency component calculation processing to be performed in the pitch angle estimation apparatus of FIG. 1.
Figure 7A:
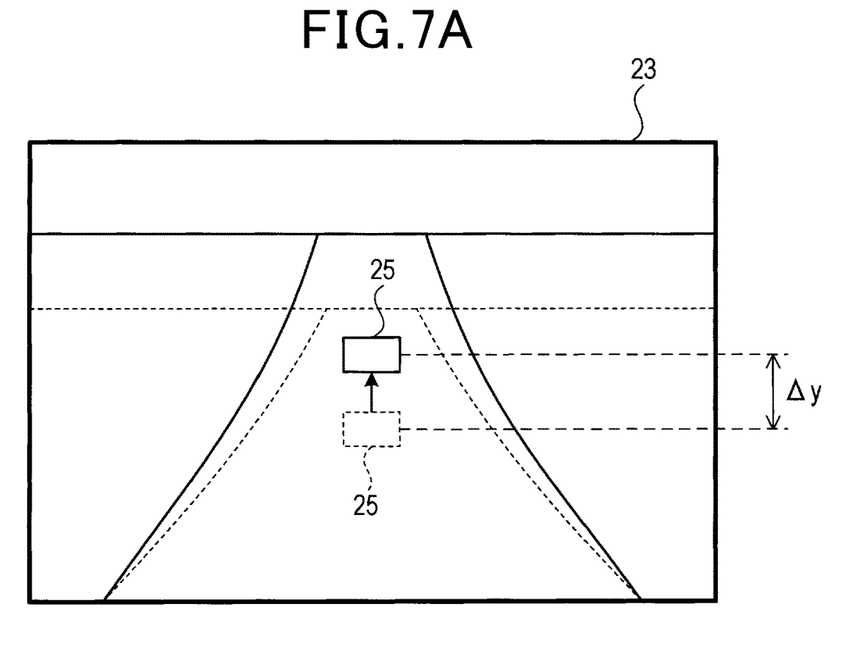
FIG. 7A is an example of estimating a change in road gradient using a change of position of a preceding vehicle in the image.

In step S31 of FIG. 6, the gradient change estimator 12 estimates the magnitude of a change in gradient of a road on which the own vehicle is traveling. A method of estimating the magnitude of the change in road gradient may be selected as appropriate. For example, as shown in FIG. 7A, the gradient change estimator 12 recognizes a preceding vehicle 25 in the image 23 acquired from the camera 17 and sequentially acquires a vertical position y of the preceding vehicle 25 in the image 23. The gradient change estimator 12 calculates an amount of change Δy (the magnitude of vertical movement of the preceding vehicle 25 in the image 23) of the vertical position y of the preceding vehicle 25 for a time interval Δt. The change in road gradient to be estimated by the gradient change estimator 12 is increased with increasing amount of change Δy.

Figure 7B:
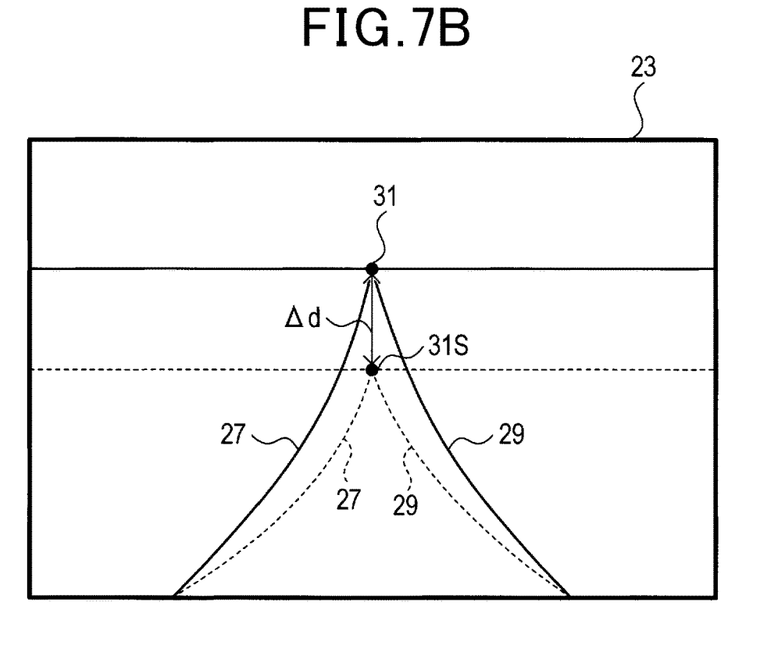
FIG. 7B is an example of estimating a change in road gradient using a vanishing point for lane partition lines in the image.

Alternatively, as shown in FIG. 7B, the gradient change estimator 12 may be configured to recognize a pair of lane partition lines (e.g., white line) 27, 29 in the image 23 acquired from the camera 17 and recognize a vanishing point 31 for the lane partition lines 27, 29. The gradient change estimator 12 calculates a distance Δd between the vanishing point 31 and a reference vanishing point 31S in the vertical direction of the image 13. The reference vanishing point 31 is a vanishing point acquired under assumption that the pitching angle of the own vehicle is zero. The change in gradient to be estimated by the gradient change estimator 12 is increased with increasing Δd.

Returning to FIG. 6, in step S32, the low frequency component calculator 11 selects a filter used to calculate the low frequency component.

The pitch angle estimation apparatus 1 is provided beforehand with a plurality of filters having different time constants. Each of the plurality of filters is a finite impulse response filter or an infinite impulse response filter.

The low frequency component calculator 11 selects one of the plurality of filters in response to the change in road gradient estimated in step S31 such that the time constant of the filter selected by the low frequency component calculator 11 is decreased with increasing change in road gradient estimated in step S31.

In step S33, the low frequency component calculator 11 applies the filter selected in step S32 to the pitch angle P calculated in step S3 and thereby calculates the low frequency components of the pitch angle P at the current frame and the pitch angle P' at the previous frame.

Figure 8A:
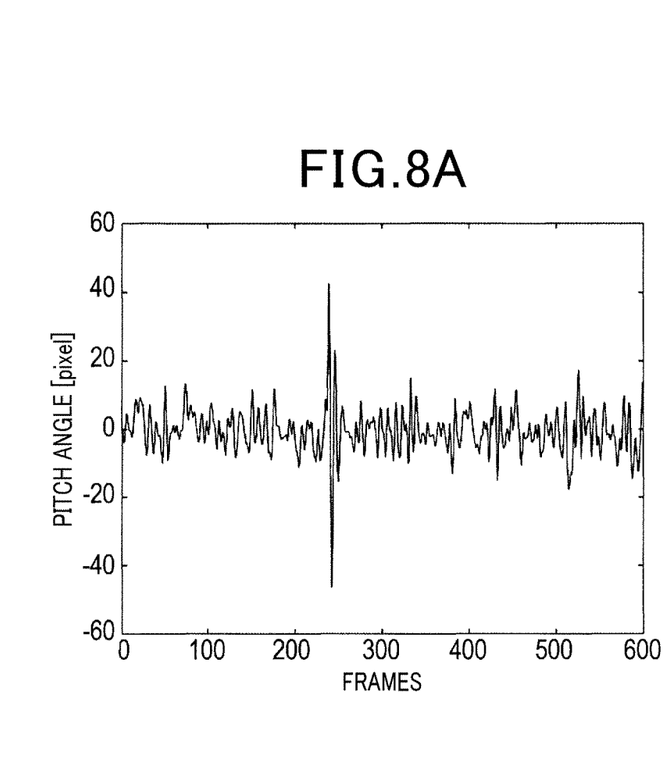
FIG. 8A is an example of time variations in pitch angle during travel of the own vehicle along a road having a small change in gradient.
Figure 8B:
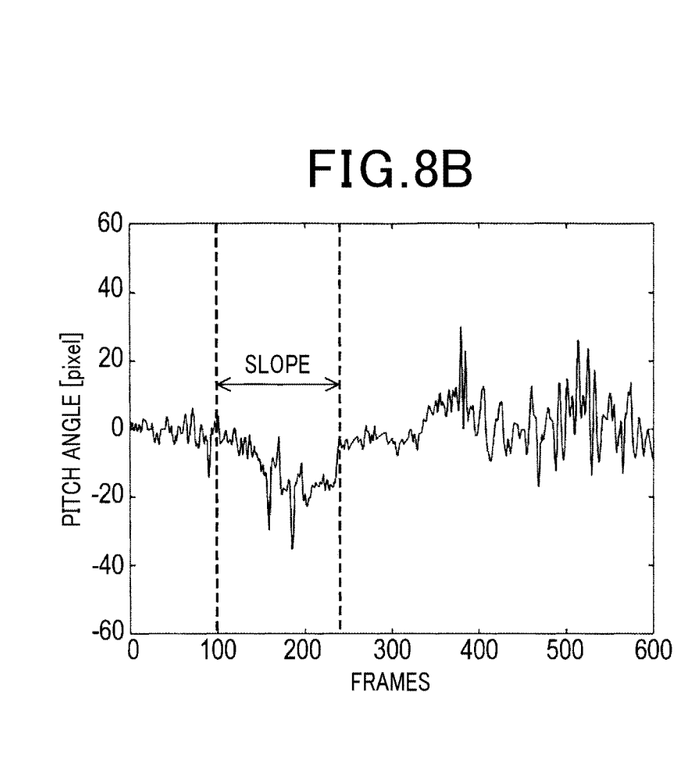
FIG. 8B is an example of time variations in pitch angle during travel of the own vehicle along a road having a large change in gradient.
Figure 9:
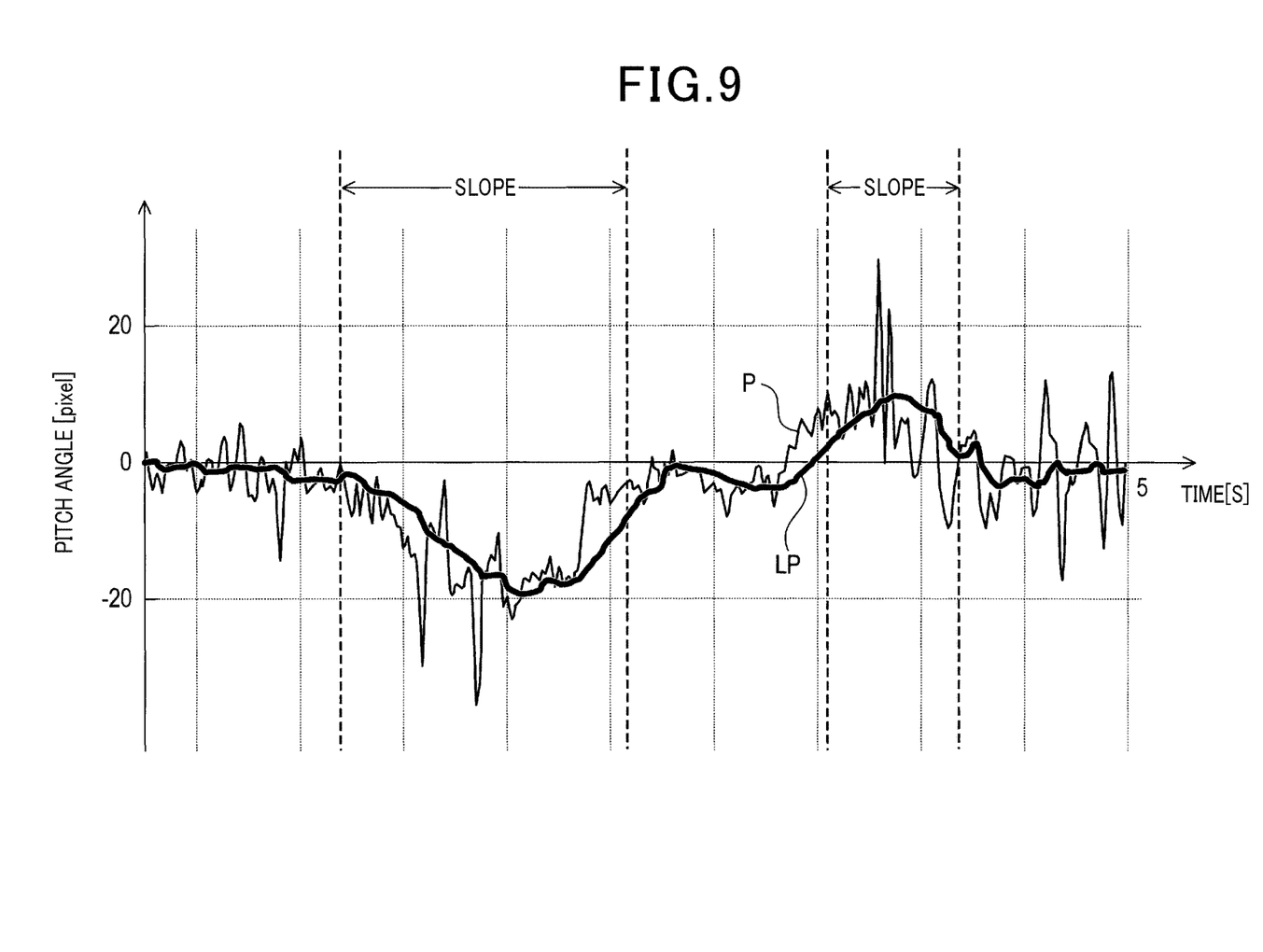
FIG. 9 is an example graph illustrating unfiltered pitch angles and a low frequency component calculated by performing filtering on the pitch angles.

FIGS. 8A, 8B, and 9 show examples of filtration processing. FIGS. 8A and 8B show the pitch angles (unfiltered) calculated in step S3 over consecutive frames. FIG. 8A shows the pitch angles when the own vehicle is traveling on a road having a small change in gradient. FIG. 8B shows the pitch angles when the own vehicle is traveling on a road having a large change in gradient.

The graph of FIG. 8B shows not only the presence of high frequency variations in pitch angle caused by pitching of the own vehicle, but also the presence of low frequency variations in pitch angle caused by changes in road gradient. FIG. 8A shows also the presence of high frequency variations in pitch angle caused by pitching of the own vehicle, but the absence of low frequency variations in pitch angle caused by a change in road gradient.

FIG. 9 is an example graph illustrating unfiltered pitch angles P over frames and a low frequency component LP calculated by filtering the pitch angles over frames. The low frequency component LP primarily includes low frequency variations in pitch angle caused by changes in road gradient, but has almost no high frequency variations in pitch angle caused by pitching of the own vehicle.

Returning to FIG. 2, in step S5, the output determiner 13 determines whether or not the road on which the own vehicle is traveling is a slope or sloping road (having a large change in gradient) based on the magnitude of the low frequency component calculated in step S4.

More specifically, if in the current cycle it is determined that the road on which the own vehicle is traveling is not a slope, the output determiner 13 determines whether or not a slope entry condition J1 is met.

The slope entry condition J1 is a condition that the magnitude of the low frequency component continuously exceeds an upper limit H (that is a predefined fixed value) over the last N1 (N1 being a positive integer) frames including the current frame.

If the slope entry condition J1 is met, the output determiner 13 determines that the road on which the own vehicle is traveling is a slope. Thereafter, the output determiner 13 continuously determines that the road on which the own vehicle is traveling is a slope until it is determined that the road on which the own vehicle is traveling is not a slope. If the slope entry condition J1 is not met, the output determiner 13 maintains the determination that the road on which the own vehicle is traveling is not a slope.

If in the current cycle it is determined that the road on which the own vehicle is traveling is a slope, the output determiner 13 determines whether or not slope exit conditions J2 and J3 are both met. The slope exit condition J2 is a condition that the magnitude of the low frequency component sequentially falls below the predefined lower limit L (that is a fixed value) over the last N2 (N2 being a positive integer) frames including the current frame. The predefined lower limit L is less than the upper limit H.

The slope exit condition J3 is a condition that an amount of change in the magnitude of the low frequency component between the current frame and the N3-th previous frame (N3 being a positive integer) is below a predetermined threshold TH. The threshold TH is a fixed value.

If the slope exit conditions J2 and J3 are both met, the output determiner 13 determines that the road on which the own vehicle is traveling is not a slope. If at least one of the slope exit conditions J2 and J3 is not met, the output determiner 13 maintains the determination that the road on which the own vehicle is traveling is a slope.

Thus, if the output determiner 13 determines that the road on which the own vehicle is traveling is not a slope, the process flow proceeds to step S6. If the output determiner 13 determines that the road on which the own vehicle is traveling is a slope, the process flow ends. FIG. 9 shows an example of determinations as to whether or not the road on which the own vehicle is traveling is a slope.

Figure 10:
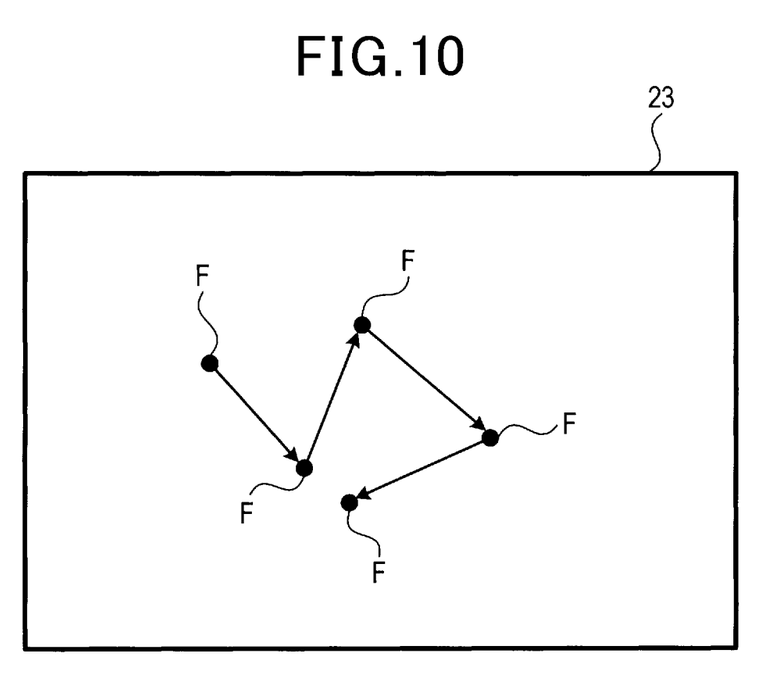
FIG. 10 is an example movement pattern of one feature point.

In step S6, the movement pattern determiner 15 acquires a movement pattern. The movement pattern represents a trajectory along which a feature point F extracted in step S21 moves in the image 23 over time, as shown in FIG. 10.

In step S7, the movement pattern determiner 15 determines whether or not the movement pattern acquired in step S6 corresponds to one of predefined anomalous patterns. The anomalous patterns are irregularly-shaped movement patterns acquired, for example, when an interface of water dropwater drops deposited on the lens of the camera 17 in a rainy weather environment, foggy weather environment, snowy weather environment or the like, is extracted as a feature point, or when part of oil film or contamination (such as bird droppings) deposited on the lens of the camera 17 is extracted as a feature point. That is, the anomalous patterns are movement patterns other than movement patterns caused by pitching of the own vehicle and changes in the road gradient.

If it is determined that the movement pattern acquired in step S6 does not correspond to any one of the anomalous patterns, the process flow proceeds to step S8. If it is determined that the movement pattern acquired in step S6 corresponds to one of the anomalous patterns, the process flow ends. In step S8, the output unit 9 outputs the pitch angle P at the current frame calculated in step S3 to the white-line recognizer 19 and the vehicle recognizer 21.

The white-line recognizer 19 corrects vertical positions of recognized white lines using the pitch angle P acquired from the pitch angle estimation apparatus 1. The vehicle recognizer 21 corrects vertical positions of recognized other vehicles using the pitch angle P acquired from the pitch angle estimation apparatus 1.

3. Advantages of First Embodiment (1A) The pitch angle estimation apparatus 1 calculates a low frequency component of the pitch angle P, and based on the magnitude of the low frequency component, determines whether or not the road on which the own vehicle is traveling is a slope. If the pitch angle estimation apparatus 1 determines that the road on which the own vehicle is traveling is a slope, the pitch angle estimation apparatus 1 does not output the pitch angle P.

That is, the pitch angle estimation apparatus 1 determines whether to output the pitch angle P based on the magnitude of the low frequency component of the pitch angle P. This can prevent the pitch angle estimation apparatus 1 from outputting an inaccurate pitch angle P due to effects of a change in road gradient.

The pitch angle estimation apparatus 1 does not necessarily have to be combined with other sensors. This can simplify the apparatus configuration.

(1B) The pitch angle estimation apparatus 1 determines whether or not the road on which the own vehicle is traveling is a slope (i.e., whether to output the pitch angle P) based on whether or not the slope entry condition J1, the slope exit conditions J2, J3 are met. This can make it possible to more accurately determine whether or not the road on which the own vehicle is traveling is a slope.

(1C) The pitch angle estimation apparatus 1 acquires a movement pattern of each feature point. If the movement pattern corresponds to one of the anomalous patterns, the pitch angle estimation apparatus 1 stops outputting the pitch angle. With this configuration, the pitch angle estimation apparatus 1 can prevent outputting an inaccurate pitch angle due to effects of rain, fog, snow or the like.

(1D) The pitch angle estimation apparatus 1 calculates an amount of movement $\Delta Y$ using the optical flow. With this configuration, the amount of movement $\Delta Y$ can be more accurately calculated.

(1E) The pitch angle estimation apparatus 1 performs filtering on the pitch angle using the finite impulse response filter or the infinite impulse response filter and thereby calculates the low frequency component. With this configuration, the low frequency component can be readily and accurately calculated.

(1F) The pitch angle estimation apparatus 1 are provided with a plurality of filters having different time constants and calculates the low frequency component using a filter selected from the plurality of filters. With this configuration, the low frequency component can be more accurately calculated.

(1G) The pitch angle estimation apparatus 1 estimates a change in gradient of the road on which the own vehicle is traveling, where a filter having a smaller time constant for a larger estimated change in road gradient is selected from the plurality of filters. With this configuration, the low frequency component can be more accurately calculated.

(1H) The pitch angle estimation apparatus 1 estimates a change in gradient of the road on which the own vehicle is traveling based on the magnitude of vertical movement of another vehicle in the image 23 acquired from the camera 17 or outlines of the lane partition lines 27, 29. With this configuration, the change in road gradient can be readily and accurately estimated.

Second Embodiment

1. Differences from First Embodiment

A second embodiment will now be described. The basic configuration of the second embodiment is similar to that of the first embodiment. Therefore, only differences of the second embodiment from the first embodiment will be described and description about the common configuration between the first and second embodiments is not provided in order to avoid repetition.

Figure 11:
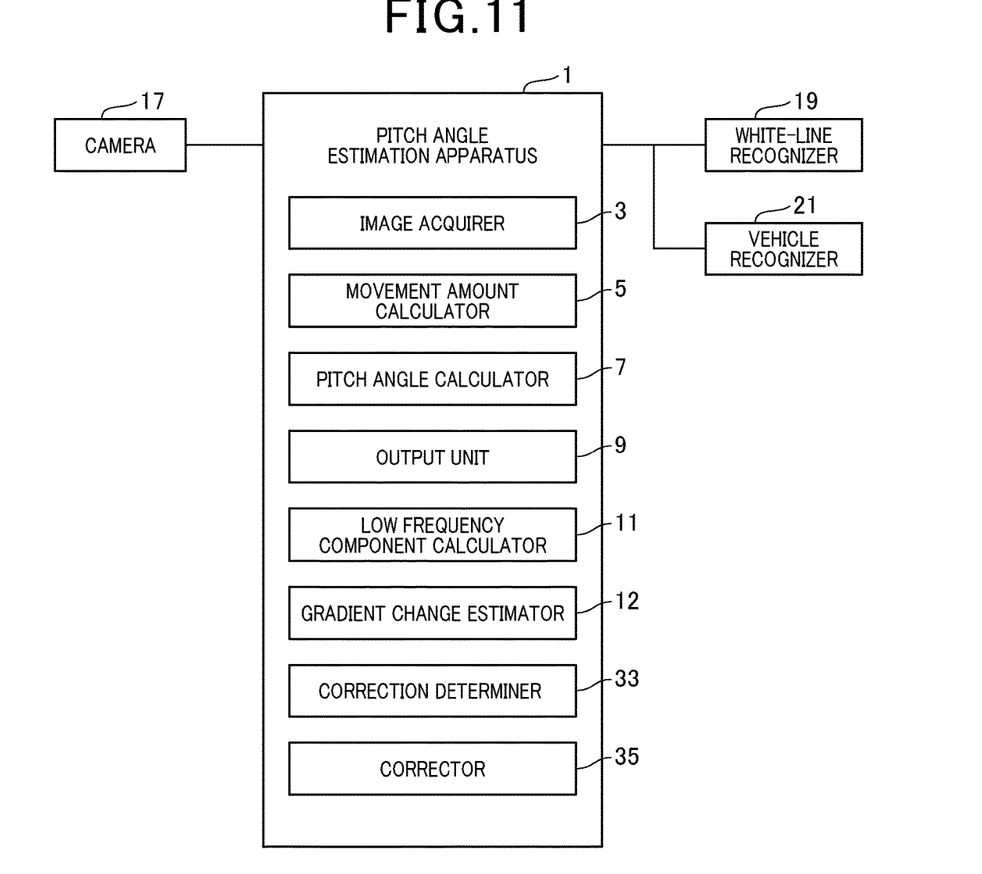
FIG. 11 is a block diagram of a pitch angle estimation apparatus in accordance with a second embodiment of the present invention.

The pitch angle estimation apparatus 1 of the first embodiment includes the output determiner 13 and the movement pattern determiner 15. Instead of the output determiner 13 and the movement pattern determiner 15, as shown in FIG. 11, a pitch angle estimation apparatus 101 of the second embodiment includes, as functional blocks, a correction determiner 33 and a corrector 35. Function of these functional blocks will be described later.

2. Processing to be Performed in Pitch Angle Estimation Apparatus

Figure 12:
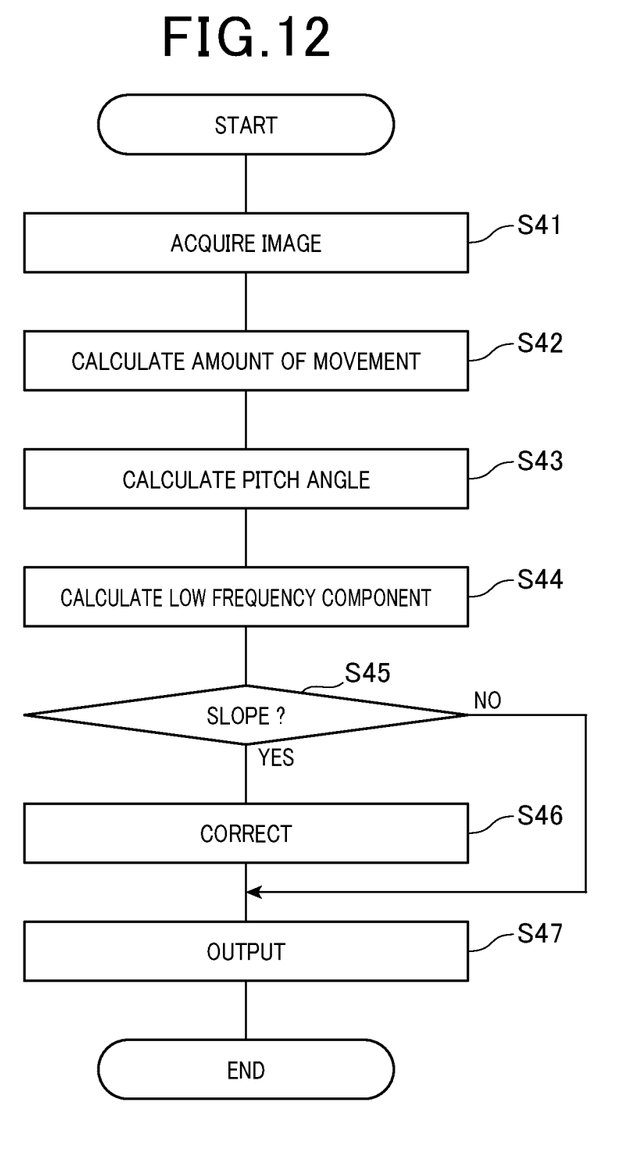
FIG. 12 is a flowchart of processing to be performed in the pitch angle estimation apparatus of FIG. 11.

Processing to be performed in the pitch angle estimation apparatus 101 every predetermined time interval will now be described with reference to FIG. 12. Steps S41-S45 are respectively similar to steps S1-S5 of the first embodiment. Step S45 is to be performed by the correction determiner 33.

If in step S45 the correction determiner 33 determines that the road on which the own vehicle is traveling is a slope, then the process flow proceeds to step S46. Otherwise, the process flow proceeds to step S47.

In step S46, the corrector 35 corrects the pitch angle P at the current frame calculated in step S43. More specifically, the corrector 35 corrects the pitch angle P at the current frame by subtracting the low frequency component calculated in step S44 from the pitch angle P at the current frame calculated in step S43. As a modification, the corrector 35 may correct the pitch angle P at the current frame by subtracting the low frequency component calculated in step S44 scaled by a factor that is less or greater than one from the pitch angle P at the current frame calculated in step S43.

In step S47, the output unit 9 outputs the pitch angle P at the current frame to the white-line recognizer 19 and the vehicle recognizer 21. More specifically, if the correction to the pitch angle P at the current frame calculated in step S43 was made in step S46, the output unit 9 outputs the corrected pitch angle P at the current frame. If no correction was made, the output unit 9 outputs an uncorrected pitch angle that is equal to the pitch angle P at the current frame calculated in step S43.

3. Advantages of Second Embodiment

The second embodiment can provide the following advantages in addition to the advantages of the first embodiment (1B) and (1D)-(1H).

(2A) The pitch angle estimation apparatus 101 calculates a low frequency component of the pitch angle P, and based on the magnitude of the low frequency component, determines whether or not the road on which the own vehicle is traveling is a slope. If it is determined that the road on which the own vehicle is traveling is a slope, the pitch angle estimation apparatus 101 corrects the pitch angle P.

With this configuration, the pitch angle estimation apparatus 101 can output an accurate pitch angle P that is less susceptible to the road gradient.

The pitch angle estimation apparatus 101 does not necessarily combine itself with other sensors, which can simplify the configuration of the apparatus.

(2B) The pitch angle estimation apparatus 101 corrects the pitch angle P at the current frame calculated in step S43 by subtracting, from the pitch angle P at the current frame, the low frequency component calculated in step S44 or the low frequency component calculated in step S44 scaled by a factor that is less or greater than one. With this configuration, the pitch angle correction can be made readily and accurately.

Other Embodiments

In the foregoing specification, specific embodiments of the present invention have been described. However, one of ordinary skill in the art appreciates that various modifications and changes can be made without departing from the scope of the present invention as set forth in the claims below.

Figure 13:
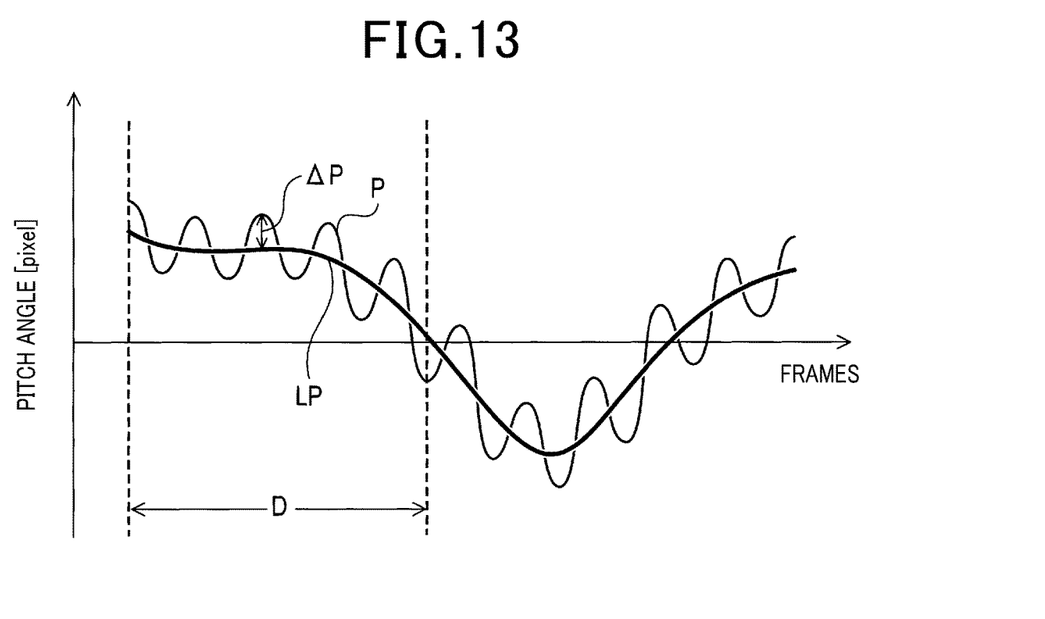
FIG. 13 is an example of selecting a filter based on an integration of differences between the pitch angle and the low frequency component over a predetermined number of successive frames.

(1) In an alternative embodiment to each of the first and second embodiments, processing to select a filter used to calculate the low frequency component may be performed as follows. First, for each of a plurality of filters, a difference integration value is calculated. The difference integration value is, as shown in FIG. 13, an integration of differences ΔP between the pitch angle P and the low frequency component LP over a predetermined number of successive frames (integration interval D). A filter that has a minimum difference integration value may be selected. With this selection processing, an optimal filter can be selected, which allows the low frequency component to be calculated more accurately.

(2) In an alternative embodiment to each of the first and second embodiments, processing to estimate the change in road gradient may be performed as follows. A pair of lane partition lines are recognized in the image acquired from the camera 17, and the recognized pair of lane partition lines are processed by bird's view conversion. It may be estimated that the change in road gradient increases as an angle between the pair of lane partition lines processed by bird's view conversion increases. Alternatively, the change in gradient may be estimated based on map data including information indicative of a gradient at each location on the map.

(3) In an alternative embodiment to the second embodiment, the pitch angle correction may be made in step S46 regardless of whether YES or NO is determined in step S45 (i.e., regardless of the magnitude of the change in road gradient).

Further, in the second embodiment, the pitch angle correction may be made in step S46 regardless of whether YES or NO is determined in step S45. If the magnitude of the change in road gradient or the low frequency component exceeds a predetermined threshold, outputting the pitch angle may be stopped as in the first embodiment.

(4) In an alternative embodiment to each of the first and second embodiments, a method of determining whether or not the road on which the own vehicle is traveling is a slope may be optimally set. For example, if the magnitude of the low frequency component exceeds an upper limit H at the current frame or continuously over the last N (N being a positive integer) frames including the current frame, it may be determined that the road on which the own vehicle is traveling is a slope. In addition, if the magnitude of the low frequency component falls below a lower limit L at the current frame or continuously over the last N (N being a positive integer) frames including the current frame, it may be determined that the road on which the own vehicle is traveling is not a slope.

(5) In each of the first and second embodiments, the pitch angle estimation apparatus 1 or 101 may include only one filter used to calculate a low frequency component.

(6) In each of the first and second embodiments, the camera 17 may be configured to capture an image of the scene to the rear of the own vehicle.

(7) The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

(8) It should be appreciated that the invention is not to be limited to the pitch angle estimation apparatuses disclosed above and that the present invention can be implemented in numerous ways, including as a system that includes any one of the pitch angle estimation apparatuses as a component, a program for enabling a computer to function as any one of the pitch angle estimation apparatuses, a non-transitory computer readable storage medium storing such a program, and a pitch angle estimation method.

What is claimed is:

1. A pitch angle estimation apparatus comprising:
   an image acquirer configured to sequentially acquire images in a forward or rearward direction of a vehicle, each image being referred to as a frame;
   a movement amount calculator configured to extract a feature point from each of the images acquired by the image acquirer and calculate an amount of movement of the feature point in a vertical direction of the image;
   a pitch angle calculator configured to calculate a pitch angle of the vehicle based on the amount of movement of the feature point calculated by the movement amount calculator;
   an output unit configured to output the pitch angle calculated by the pitch angle calculator;
   a low frequency component calculator configured to calculate a low frequency component of the pitch angle calculated by the pitch angle calculator; and
   an output determiner configured to determine whether to output the pitch angle based on the magnitude of the low frequency component calculated by the low frequency component calculator.

2. The apparatus of claim 1, wherein the output determiner is configured to, during the output unit outputting the pitch angle, if the magnitude of the low frequency component continuously exceeds an upper limit over the last N1 (N1 being a positive integer) frames including the current frame, stop outputting the pitch angle, and during the output unit outputting no pitch angle, if the magnitude of the low frequency component continuously falls below a lower limit over the last N2 (N2 being a positive integer) frames including the current frame and if an amount of change in the magnitude of the low frequency component between the current frame and the N3-th previous frame (N3 being a positive integer) is below a predetermined threshold, resume outputting the pitch angle.

3. The apparatus of claim 1, further comprising a movement pattern determiner configured to acquire a movement pattern that is a pattern of movement of the feature point in the image extracted by the movement amount calculator, and determine whether or not the movement pattern corresponds to one of predetermined anomalous patterns,
   wherein the output determiner is configured to, if it is determined by the movement pattern determiner that the movement pattern corresponds to one of the predetermined anomalous patterns, stop outputting the pitch angle.

4. The apparatus of claim 1, wherein the movement amount calculator is configured to, using optical flow of the feature point, calculate the amount of movement of the feature point.

5. The apparatus of claim 1, wherein the pitch angle calculator is configured to calculate the pitch angle of the vehicle by an integrator having a preset forgetting factor of greater than zero integrating the amount of movement of the feature point.

6. The apparatus of claim 1, wherein the low frequency component calculator includes at least one finite or infinite impulse response filter, and is configured to calculate the low frequency component by performing filtering on the pitch angle using the at least one finite or infinite impulse response filter.

7. The apparatus of claim 6, wherein the low frequency component calculator includes a plurality of finite or infinite impulse response filters having different time constants, and is configured to select one of the plurality of finite or infinite impulse response filters and calculate the low frequency component by performing filtering on the pitch angle using the selected one of the plurality of finite or infinite impulse response filters.

8. The apparatus of claim 7, further comprising a gradient change estimator configured to estimate a change in gradient of a road on which the vehicle is traveling,
   wherein the low frequency component calculator is configured to select a filter having a smaller time constant for a larger change in gradient estimated by the gradient change estimator.

9. The apparatus of claim 8, wherein the gradient change estimator is configured to estimate the change in gradient of the road on which the vehicle is traveling based on the magnitude of vertical movement of another vehicle in the image or outlines of lane partition lines in the image.

10. The apparatus of claim 7, wherein the low frequency component calculator is configured to select, from the plurality of finite or infinite impulse response filters, a filter that can minimize a difference integration value which is an integration of differences between the pitch angle calculated by the pitch angle calculator and the low frequency component calculated by the low frequency component calculator over a predetermined number of successive frames.

11. A pitch angle estimation apparatus comprising:
    an image acquirer configured to sequentially acquire images in a forward or rearward direction of a vehicle, each image being referred to as a frame;
    a movement amount calculator configured to extract a feature point from each of the images acquired by the image acquirer and calculate an amount of movement of the feature point in a vertical direction of the image;

a pitch angle calculator configured to calculate a pitch angle of the vehicle based on the amount of movement of the feature point;

a low frequency component calculator configured to calculate a low frequency component of the pitch angle calculated by the pitch angle calculator;

a corrector configured to correct the pitch angle by reducing the low frequency component of the pitch angle calculated by the low frequency component calculator; and an output unit configured to output the pitch angle calculated by the pitch angle calculator and then corrected by the corrector.

12. The apparatus of claim 11, wherein the corrector is configured to correct the pitch angle by subtracting, from the pitch angle calculated by the pitch angle calculator, the low frequency component calculated by the low frequency component calculator or the low frequency component calculated by the low frequency component calculator, scaled by a factor that is less or greater than one.

13. The apparatus of claim 11, wherein the movement amount calculator is configured to, using optical flow of the feature point, calculate the amount of movement of the feature point.

14. The apparatus of claim 11, wherein the pitch angle calculator is configured to calculate the pitch angle of the vehicle by an integrator having a preset forgetting factor of greater than zero integrating the amount of movement of the feature point.

15. The apparatus of claim 11, wherein the low frequency component calculator includes at least one finite or infinite impulse response filter, and is configured to calculate the low frequency component by performing filtering on the pitch angle using the at least one finite or infinite impulse response filter.

16. The apparatus of claim 15, wherein the low frequency component calculator includes a plurality of finite or infinite impulse response filters having different time constants, and is configured to select one of the plurality of finite or infinite impulse response filters and calculate the low frequency component by performing filtering on the pitch angle using the selected one of the plurality of finite or infinite impulse response filters.

17. The apparatus of claim 16, further comprising a gradient change estimator configured to estimate a change in gradient of a road on which the vehicle is traveling, wherein the low frequency component calculator is configured to select a filter having a smaller time constant for a larger change in gradient estimated by the gradient change estimator.

18. The apparatus of claim 17, wherein the gradient change estimator is configured to estimate the change in gradient of the road on which the vehicle is traveling based on the magnitude of vertical movement of another vehicle in the image or outlines of lane partition lines in the image.

19. The apparatus of claim 16, wherein the low frequency component calculator is configured to select, from the plurality of finite or infinite impulse response filters, a filter that can minimize a difference integration value which is an integration of differences between the pitch angle calculated by the pitch angle calculator and the low frequency component calculated by the low frequency component calculator over a predetermined number of successive frames.

* * * * *